(12) United States Patent
Ishii et al.

(10) Patent No.: US 6,869,228 B2
(45) Date of Patent: Mar. 22, 2005

(54) FERRULE AND METALLIC DIE ASSEMBLY FOR MAKING THE SAME

(75) Inventors: Kiyoshi Ishii, Ishikawa (JP); Kenichi Mitani, Tokyo (JP); Masumi Okajima, Tokyo (JP); Masafumi Okuma, Saitama (JP)

(73) Assignee: Kabushiki Kaisha Act One, Tokyo (JP)

( * ) Notice: Subject to any disclaimer, the term of this patent is extended or adjusted under 35 U.S.C. 154(b) by 82 days.

(21) Appl. No.: 10/308,559

(22) Filed: Dec. 3, 2002

(65) Prior Publication Data

US 2004/0005122 A1 Jan. 8, 2004

(30) Foreign Application Priority Data

Jul. 5, 2002 (JP) .......................................... 2002-197323

(51) Int. Cl.[7] .................................................. G02B 6/36
(52) U.S. Cl. ........................................................ 385/78
(58) Field of Search .......................................... 385/78

(56) References Cited

FOREIGN PATENT DOCUMENTS

| | | | |
|---|---|---|---|
| EP | 0 737 877 A2 | 10/1996 | |
| JP | 8286080 A | 11/1996 | |
| JP | 9286080 A | 11/1997 | |
| JP | 2000084974 A | 3/2000 | |
| JP | 2001096570 A | 4/2001 | |
| JP | 2001141957 A | 5/2001 | |
| WO | WO 00/15406 A1 | 3/2000 | |

*Primary Examiner*—Javaid H. Nasri
(74) *Attorney, Agent, or Firm*—Marshall & Melhorn, LLC

(57) ABSTRACT

The ferrule of the present invention comprises a ferrule main body including an insert pipe defining an outer circumferential surface of the ferrule main body and a molded plastic member disposed inside the insert pipe integrally therewith and having an optical fiber receiving bore in an axial center thereof; and a tubular base portion molded onto a rear end of the ferrule main body. Because the outer diameter of the ferrule main body is defined by the insert pipe, the rigidity, circularity and dimensional precision of the outer diameter can be improved. Because the base portion is molded separately from the ferrule main body, the manufacturing process can be simplified and the production cost can be reduced.

17 Claims, 13 Drawing Sheets

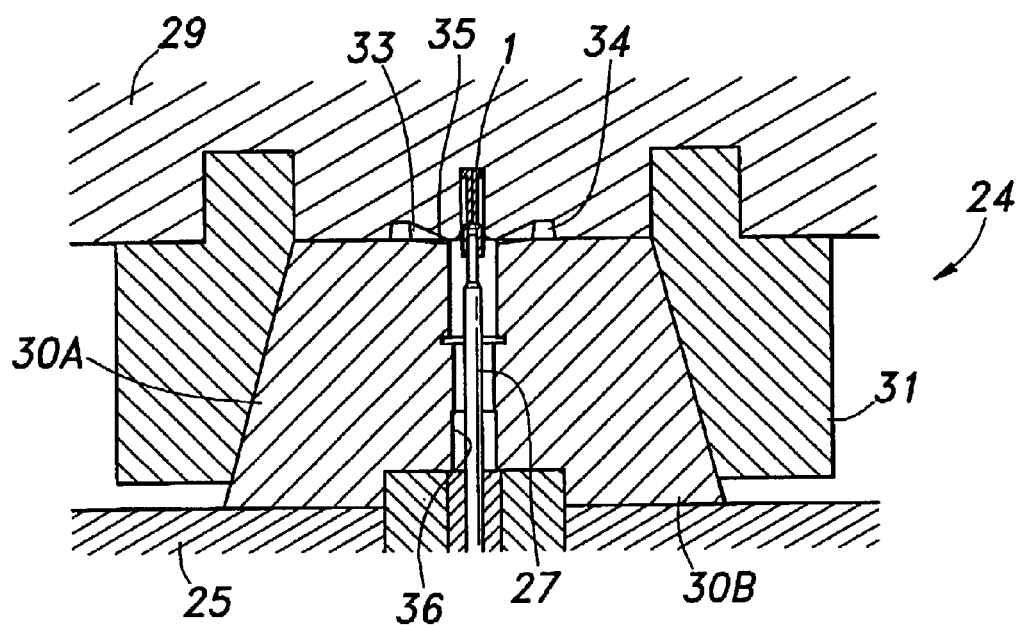
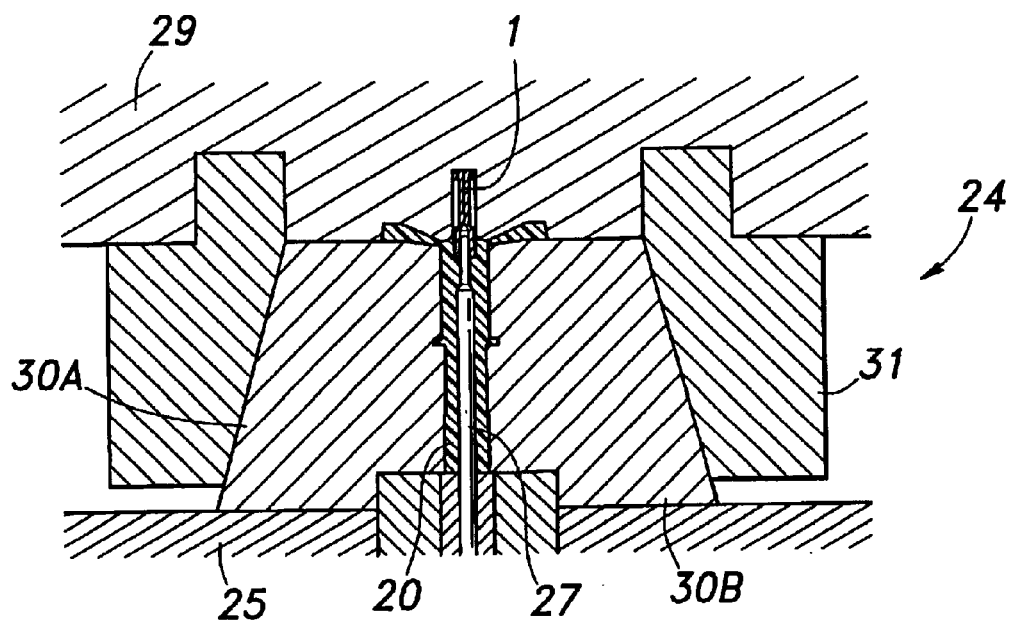

FERRULE AND METALLIC DIE ASSEMBLY FOR MAKING THE SAME

TECHNICAL FIELD

The present invention relates to a ferrule that forms a main component of optical connectors used for optical communication, and a metallic die assembly for making such a ferrule. In particular, the present invention relates to the production of ferrules of various forms such as SC, ST, MU and LC types by preparing a ferrule main body formed as a primary molded product, preferably, having an insert pipe injection molded therein, and integrally forming a base portion onto a rear end of the ferrule main body by injection molding to form a secondary molded product.

BACKGROUND OF THE INVENTION

A ferrule of this type, be it a single core type or a multiple core type, requires a high level of dimensional precision. In particular, the front end of the ferrule is required to have a highly precise outer diameter and a high level of coaxiality with respect to the axial center thereof. For this reason, zirconia is preferred as the material for such a ferrule. When making a ferrule out of zirconia, typically, a mixture of zirconia powder and plastic material is injection molded or press molded, and the molded product is sintered and finished by using abrasive material such as diamond or the like.

A zirconia ferrule is generally satisfactory in terms of performance such as dimensional precision, and can adequately meet the various requirements, but is not suitable for mass production and cost reduction because of the difficulty in manufacturing. Because a demand for ferrules is expected to rise sharply in the future, there is a growing desire to develop plastic ferrules so that they can be made by injection molding thermoplastic plastic material in a mass production process in an economical manner.

A plastic ferrule is suitable for mass production and cost reduction as compared to a zirconia ferrule because of case in manufacturing, but is known to have problems in achieving a required level of performance such as dimensional precision because of the thermal shrinkage of the plastic material following the injection molding process which impairs the dimensional precision and coaxiality of the front end of the ferrule. Also, the core pin for forming the bore for receiving a fiber core is so thin that it is prone to breaking and bending due to the injection pressure of the plastic material.

To improve the dimensional precision which is the problem with such a plastic ferrule, Japanese patent laid open publication (kokai) No. 2000-84974 and Japanese patent laid open publication (kokai) No. 2001-96570 disclose a ferrule having a metallic insert pipe disposed around a front end thereof and extending at least up to a flange portion provided in an intermediate part thereof, the front end having a core receiving bore for receiving an extremely fine optical fiber core in an axial center thereof, and a method for making such a ferrule.

According to this prior art, the plastic ferrule is produced by placing an insert pipe having communication holes for passing plastic material therethrough in a part corresponding to a flange in a metallic die assembly, placing a core pin for forming a bore for receiving a core and a sheath at an end of an optical fiber in an axial center thereof, and injecting plastic material from a gate provided adjacent to the communication holes so that the plastic material is filled into the insert pipe from the communication holes and an entire ferrule including the flange is integrally molded by injection molding.

According to this plastic ferrule, the outer circumferential surface of the front part is given with a high level of circularity and coaxiality as well as a high level of outer dimensional precision owing to the use of an insert pipe in the injection molding process. Also, a precise alignment is achieved when connecting the ferrule to an opposing ferrule via a sleeve fitted onto the outer circumferential surface thereof, and a high precision in the positioning of an optical fiber core can be achieved when fitting the optical fiber core into the core receiving bore in the axial center. This contributes to the reduction in the transmission loss.

According to the technology disclosed in Japanese patent laid open publication No. 8-286080 and Japanese patent laid open publication No. 2001-141957, a ferrule main body consisting of a tubular member made of such material as zirconia and glass and having a core wire receiving bore formed in an axial center thereof is prepared in advance as a front end component, and a base portion having a flange portion on an outer circumference thereof and a sheath receiving bore in an axial center thereof is integrally molded onto the rear end of the ferrule main body by placing the ferrule main body in a metallic die assembly as an insert component and conducting an injection molding process by using this metallic die assembly.

Optical communication is being extended to home uses, and an increase in the amount of data transmission and a more wide-spread use of two-way communication are expected to occur in the immediate future. This will trigger an increase in the demand for multi-core and more compact ferrules, and this will in turn require an increased level of precision in the manufacturing technology while enabling mass production and cost reduction at the same time. Use of zirconia for the ferrule according to the prior art prevents such mass production and cost reduction as it requires a highly complex manufacturing process.

According to the prior art disclosed in Japanese patent laid open publications (kokai) Nos. 2000-84974 and 2001-96570, because the molded portion includes a ferrule main body on the front end having a core receiving bore in an axial center thereof and a base portion on the rear end having a sheath receiving bore in an axial center thereof and a flange portion on an outer circumferential surface thereof, and is injection molded onto the insert pipe as a single process, although the ferrule main body on the front end may have a common structure, if the base portion on the rear end is required to have a different structure, the entire ferrule must be made as a different unit.

For instance, ferrules of different types such as SC type, ST type, MU type and LC type are required to be manufactured separately even when the ferrule main body may consist of a common unit. This prevents a large scale production and the resulting cost reduction, and creates an undesirably administrative complication in procuring and stocking component parts and promptly delivering them to the user.

When forming the entire molded portion as a single process, the cavity for the base portion in the rear end to be increased in size, and this increases the amount of the molding plastic material. This in turn causes a difficulty in controlling the injection pressure for the cavity for molding the ferrule main body on the front end. If the injection pressure is unevenly applied to the extremely fine core pin for forming the core receiving bore in the axial center, the core pin could be bent, broken or otherwise damaged.

For instance, in the case of the ST type ferrule having a lateral hole in the base portion that extends perpendicularly with respect to the axial center, because a core for forming the lateral hole is required to be provided on an inner side of a split core assembly and this core tends to apply a side pressure to the core pin (the receiving pin that opposes the extremely fine core pin), there is a risk of bending or breaking the extremely fine core pin.

The front end is required to be made of molding plastic material suitable for achieving a high dimensional precision as this part requires a high precision, but the rear end does not necessarily require a high dimensional precision, and using the expensive plastic material suitable for use in the front end also in the rear end results in an unnecessary material quality for the rear end and an unwarranted increase in the manufacturing cost.

Increasing the length of the passage for the molding plastic material in the die assembly increases an unevenness of temperature in the molding plastic material and die assembly, and this in turn causes an unevenness in the fluidicity and thermal shrinkage of the plastic material, thereby impairing dimensional precision. In particular, the front end of the ferrule which corresponds to the front end of the flow of the molding plastic material contains a relatively large amount of slag, and this could cause flow marks and sink marks in this part, thereby causing a distortion of the inner circumferential surface of the core receiving bore. In particular, the coaxiality of the core receiving bore with respect to the insert pipe defining the outer diameter tends to be impaired.

According to the prior art disclosed in Japanese patent laid open publication (kokai) No. 9-286080, the cylindrical ferrule main body made of glass, metal, ceramics or plastic (glass in the disclosed embodiment) and having a key slot formed around the rear end is prepared as a primary product, and a base portion made of plastic material is integrally attached to the rear end of the ferrule main body by using this ferrule main body as an insert component. However, this prior art also presents various problems that need to be addressed.

For instance, manufacturing the ferrule main body by using glass, metal or ceramics requires a highly complex manufacturing process (in particular for achieving a required finish for the inner and outer circumferential surfaces) so that a cost reduction through mass production is difficult to accomplish. Also, a firm attachment between the ferrule main body and the base portion cannot be achieved because they are simply held fast against pulling and rotation by means of the plastic material that is filled into the key slot.

When the ferrule is made solely of plastic material, the required coaxiality and dimensional precision of the inner and outer diameters cannot be achieved, and the variations in the quality of the products results in a poor yield ratio. This again prevents mass production and the resulting reduction in cost. In particular, when the base portion in the rear end is made of plastic material different from that of the ferrule main body, the two materials are attached to each other primarily via the key slot without being bonded together firmly enough and the required bonding strength may not be achieved.

According to the prior art disclosed in Japanese patent laid open publication No. 2001-141957, a cylindrical ferrule main body made of zirconia or glass is prepared as a primary product, and a base portion made of plastic material is integrally attached to the rear end of the ferrule main body using the ferrule main body as an insert component. Similarly as the case of Japanese patent laid open publication No. 8-286080, there are a number of problems that need to be addressed, and the required bonding strength cannot be achieved because of the absence of a feature such as a key slot.

BRIEF SUMMARY OF THE INVENTION

In view of such problems of the prior art, a primary object of the present invention is to provide a ferrule that forms a main component of optical connectors used for optical communication which is free from such problems of the prior art.

A second object of the present invention is to provide a ferrule that can be used commonly for forming various forms of ferrules such as SC type, ST type, MU type and LC type.

A third object of the present invention is to provide a ferrule which is economical to produce.

A fourth object of the present invention is to provide a ferrule that can be produced at a high precision.

A fifth object of the present invention is to provide a metallic die assembly for injection molding such a ferrule.

According to the present invention, such objects can be accomplished by providing a ferrule, comprising: a ferrule main body including an insert pipe defining an outer circumferential surface of the ferrule main body and a molded plastic member made of a first plastic material and disposed inside the insert pipe integrally therewith and having an optical fiber receiving bore in an axial center thereof; and a tubular base portion made of a second plastic material and molded onto a rear end of the ferrule main body, the base portion having a communication bore aligned with the fiber receiving bore of the ferrule main body formed in an axial center thereof.

According to this ferrule, because the outer diameter of the ferrule main body is defined by the insert pipe, the rigidity, circularity and dimensional precision of the outer diameter can be improved. Because the base portion is molded separately from the ferrule main body, the manufacturing process can be simplified and the production cost can be reduced.

Typically, the plastic material for the base portion is selected from those plastic materials which are more economical than that of the molded portion of the ferrule main body. For instance, the molded portion of the ferrule main body which requires a high dimensional precision may be made of type I or type II liquid crystal polymer while the base portion which does not require such a high dimensional precision may be made of more economical and moldable plastic material such as type I or type II liquid crystal polymer of the same kind but of a lower grade, or different plastic material of a lower grade such as polybutylene terephtalate.

According to such a ferrule, by making the base portion which uses a relatively large amount of plastic material and is not required to have a very high dimensional precision with a relatively economical plastic material, an excessively high quality and an unnecessary increase in cost can be avoided as compared to the conventional plastic ferrule which is entirely made of a same plastic material including the base portion thereof.

In particular, because the ferrule main body can be used commonly for various applications including the case where the ferrule main body is used by itself in addition to the case where the ferrule main body is a part of a ferrule, the unit cost can be minimized and stocking and procuring ferrules of various types can be simplified.

According to such a ferrule, by forming the insert pipe with a stainless steel pipe, the manufacturing process can be carried out more economically and easily as compared to the conventional manufacturing process using zirconia. In particular, the desired accuracy of the inner and outer diameter can be achieved easily by machining or grinding. When the ferrule main body is used as a component, the outer circumferential surface thereof can be laser welded for mounting.

Because the molded portion of the ferrule main body and the base portion are injection molded as two separate molding processes, the materials for the two parts can be either identical, same in kind or different according to the required performance and cost. Because the entire ferrule is not required to be injection molded from expensive molding plastic material, the manufacturing cost can be reduced. Also, the cavity of the metallic die assembly is relatively small because the injection molding is performed in two separate process, the molding process can be performed while ensuring a uniform dimensional precision.

When the ferrule is used as a part of a butt connector, a split sleeve can be favorably fitted on the outer surface of the ferrule main body when joining it to another ferrule main body in a mutually abutting relationship.

A rear end of the insert pipe may be provided with an engagement portion which is exposed on an outer circumferential surface of the ferrule main body, and the base portion is molded onto the engagement portion. The engagement portion may consist of either a projection or a recess.

The engagement portion provided around the rear end of the ferrule main body provides a means for handling the ferrule main body both easily and safely by using a hand or a manipulator. Also, when manufacturing a ferrule of the ST type or other type as a secondary molded product by injection molding a base portion onto the rear end of the ferrule main body so as to integrally join them together, the engagement portion of the insert pipe becomes embedded in the molded portion of the base portion, and thereby prevents the rotation and axial movement between them. Also, if a part of the molded portion projects rearward from a rear end of the insert pipe, and the base portion is molded onto the projecting part of the molded portion, the welding between the molded portions of the two parts reinforces the attachment between them, and serves as a connecting part for firmly joining them together.

According to a preferred embodiment of the present invention, the optical fiber receiving bore includes a core receiving bore in a front end thereof and a sheath receiving bore in a rear end thereof, and the insert pipe comprises a thick walled portion surrounding the core receiving bore and a thin walled portion surrounding the sheath receiving bore. Thus, the wall thickness of the molded portion can be provided with a substantially uniform wall thickness, and this simplifies the design of the metallic die assembly that ensures a favorable molding quality.

The ferrule of the present invention can be conveniently molded by using a die assembly which comprises a first die component defining a first cavity adapted to receive the ferrule main body while exposing a rear end portion of the ferrule main body; a second die component defining a second cavity communicating with the first cavity and adapted to mold the base portion onto a rear end of the ferrule main body received in the first cavity; a core pin adapted to be passed axially centrally from an axial end remote from the first cavity into the second cavity to form the communication bore of the base portion, the core pin being provided with a free end which closely fits into the sheath receiving bore of the ferrule main body.

The ferrule according to the present invention can be manufactured by a method which comprises the steps of: placing an insert pipe intended as an outer tube preferably having an engagement portion formed around a rear end thereof in a primary metallic die assembly; injecting plastic material into the insert pipe to form a ferrule main body including a plastic molded portion defining a fiber receiving bore in an axial center thereof; placing the ferrule main body in a secondary metallic die assembly; and injecting plastic material into the secondary metallic die assembly with the ferrule main body serving as an insert component to form a tubular base portion having a fiber receiving bore continuous with the fiber receiving bore of the ferrule main body formed in an axial center thereof and integrally joined with the plastic molded member of the ferrule main body preferably so as to cover the engagement portion of the insert pipe.

According to this method for manufacturing a ferrule main body, by preparing the ferrule main body in advance as a primary molded product, the ferrule main body may be used either as a ferrule for an optical semiconductor module by itself or a part of a ferrule of any one of a number of different types including the ST type, SC type, MU type and LC type for butt connection. Therefore, the ferrule main body can be used commonly for a large number of applications, and this allows the reduction in cost by means of mass production and simplification of procurement and stocking of component parts (ferrule main body) when manufacturing ferrules of various different types.

The ferrule main body may be molded in the primary metallic die assembly in such a manner that a rear end of the plastic molded member projects from a rear end of the insert pipe, and the base portion may be molded in the secondary metallic die assembly in such a manner that the base portion covers both the engagement portion of the insert pipe and an outer circumferential surface of the rear end of the plastic molded member of the ferrule main body and that the base portion is welded to an outer circumferential surface and an end surface of the rear end of the plastic molded member. According to this method for manufacturing the ferrule, the welding of the two molded portions can be effected over a large area, and the bonding strength can be maximized.

The base portion may be molded of plastic material of either a same kind or a different kind as or from the plastic material of the molded plastic material of the ferrule main body, and having a lower molding temperature. If the molding temperature for the base portion is higher than that of the molded plastic material of the ferrule main body, remelting of a large part of the molded portion of the ferrule main body may occur, and this is not desirable as it may impair the dimensional precision. It is therefore desirable to remelt a part of the molded portion of the ferrule main body to such an extent as is necessary for the base portion to be integrally bonded to the ferrule main body.

BRIEF DESCRIPTION OF THE DRAWINGS

Now the present invention is described in the following with reference to the appended drawings, in which:

FIG. 12 is a view similar to FIG. 10 showing the process of making a ST ferrule using the metallic die assembly illustrated in FIG. 10, and, in particular, the step of closing the die assembly to define the cavity for the base portion;

FIG. 13 is a view similar to FIG. 10 showing the process of making a ST ferrule using the metallic die assembly illustrated in FIG. 10, and, in particular, the step of filling the molded plastic material into the cavity for the ST type base portion to integrally join the ferrule main body and base portion to each other;

DETAILED DESCRIPTION OF THE PREFERRED EMBODIMENTS

Figure 1:
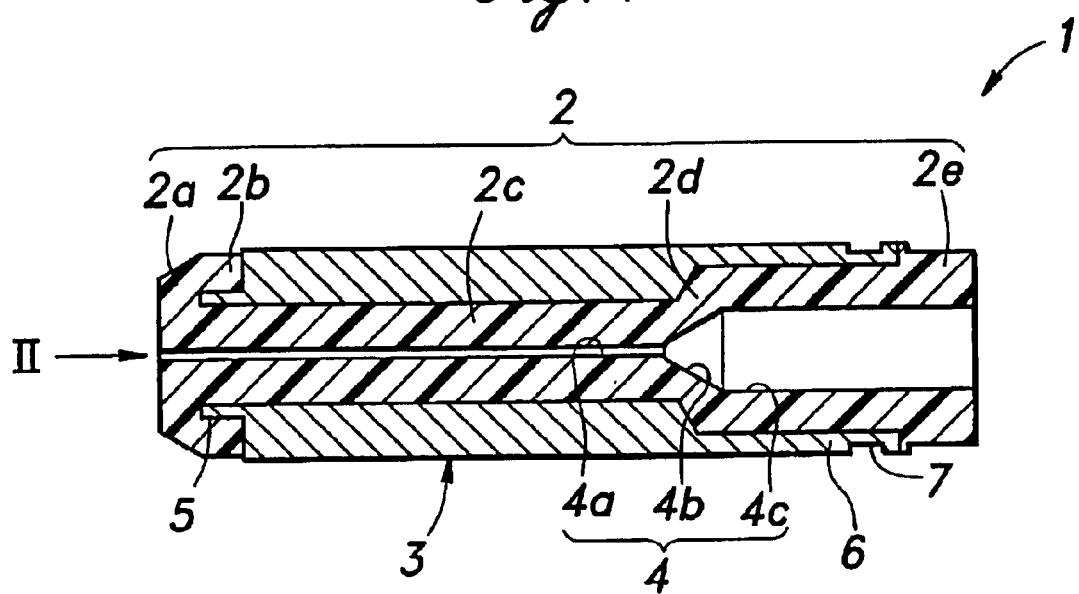
FIG. 1 is a longitudinal sectional view of a ferrule main body embodying the present invention.
Figure 2:
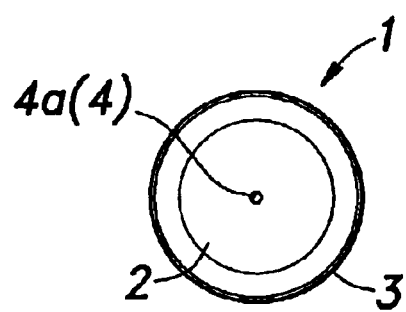
FIG. 2 is an end view as seen from the direction indicated by arrow II of FIG. 1.
Figure 3:
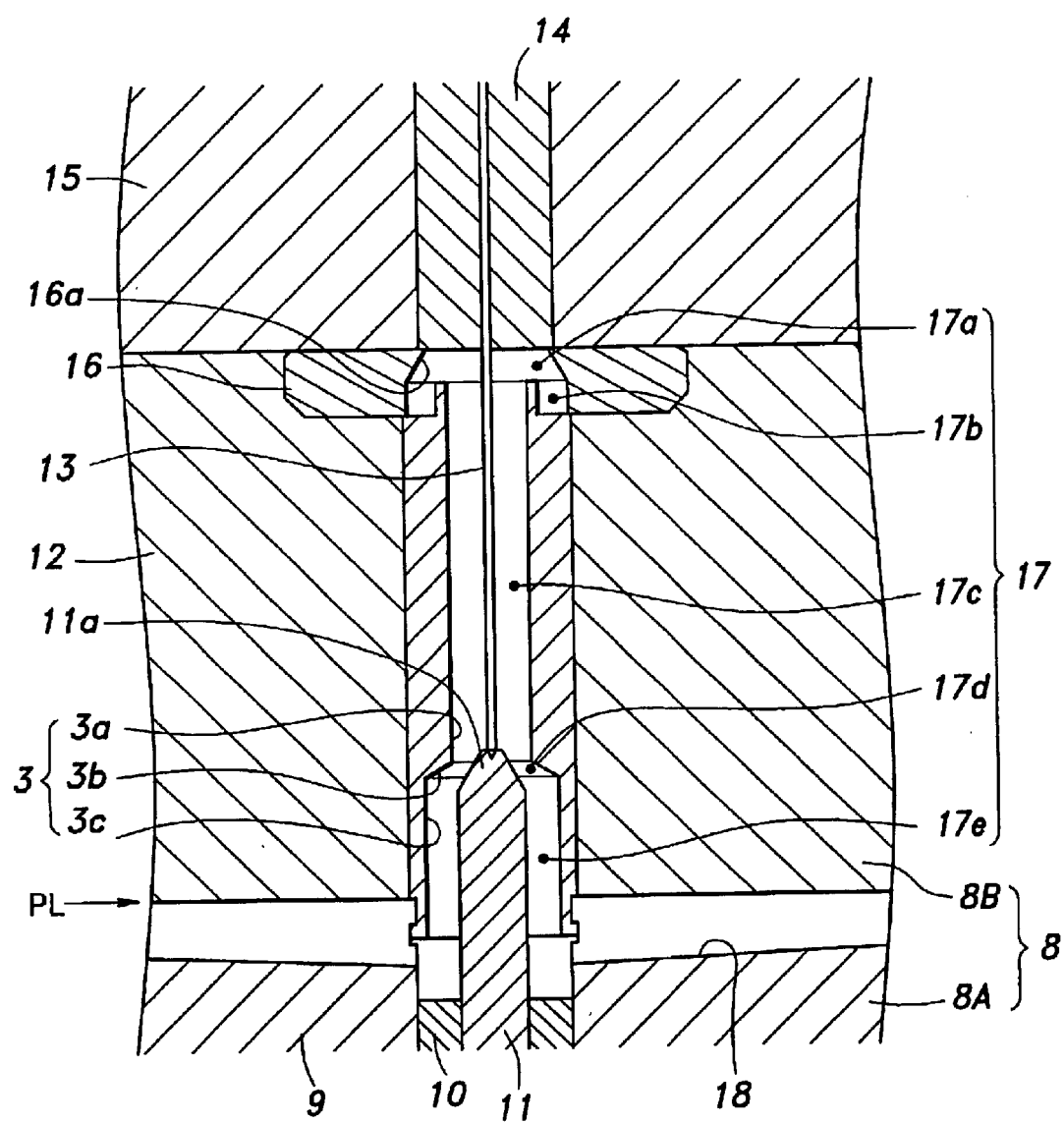
FIG. 3 is a fragmentary vertical sectional view of the metallic die assembly for injection molding the ferrule main body 1 illustrated in FIG. 1.

The ferrule and method for making the same according to the present invention are described in the following in terms of concrete embodiments illustrated in the appended drawings. FIGS. 1 and 2 show a ferrule main body according to the present invention, and FIG. 3 is a metallic die assembly for molding the ferrule main body as a primary molded product.

Referring to FIGS. 1 and 2, the ferrule main body 1 comprises an inner tube consisting of a molded portion 2 for receiving an optical fiber in an axial center thereof, and an outer tube consisting of an insert pipe 3 for defining the outer diameter of the molded portion 2. The inner and outer tubes are integrally joined to each other by placing the insert pipe 3 in the metallic die assembly and injection molding the molded portion 2 therein as will be described hereinafter.

The molded portion 2 is axially centrally provided with a core receiving bore 4a in a front end thereof for receiving the core of an optical fiber, a sheath receiving bore 4c in a rear end thereof for receiving the sheath of the optical fiber, and a tapered bore 4b communicating the core receiving bore 4a and sheath receiving bore 4c with each other. The core receiving bore 4a, sheath receiving bore 4c and tapered bore 4b jointly form an optical fiber receiving bore 4.

The molded portion 2 is formed by injection molding plastic material which is selected from various thermoplastic materials and provided with desired mechanical strength and dimensional precision. In particular, liquid crystal polymers (either type I or type II) are preferred among other engineering plastic materials as they are favorable in terms of mechanical strength and dimensional stability, and are suited for machining.

The insert pipe 3 comprises a relative thick-walled main portion, a reduced diameter portion 5 having a reduced outer diameter in a front end thereof, a thin-walled portion 6 having an enlarged inner diameter which is enlarged from the inner diameter of the remaining part of the insert pipe 3 in a rear end thereof and an engagement portion 7 provided on the outer circumferential surface of the rear end of the thin-walled portion 6. The core receiving bore 4a having a uniform and small diameter extends across the length of the thick-walled main portion and reduced diameter portion 5. The thick-walled main portion and thin-walled portion 6 have a uniform outer diameter. The tapered bore 4b corresponds to the transition between the thick-walled main portion and thin-walled portion 6. In the embodiment illustrated in FIGS. 1 and 2, the engagement portion 7 consists of an annular groove formed around the outer circumferential surface of the rear end of the thin-walled portion 6 of the insert pipe 3.

The molded portion 2 comprises a tapered tip portion 2a formed on the front end of the reduced diameter portion 5, a slag reservoir 2b formed around the outer circumferential surface of the reduced diameter portion 5, a small diameter cylindrical portion 2c defining the core wire receiving bore 4a in the axial center thereof inside the thick-walled main portion of the insert pipe 3, a tapered portion 2d provided inside the transitional part between the thick-walled main portion and thin-walled portion 6 of the insert pipe 3, and a large diameter cylindrical portion 2e defining the sheath receiving bore 4c in the axial center thereof inside the inner circumference of the thin-walled portion 6. The rear end of the large diameter cylindrical portion 2e is exposed and projects from the rear end of the insert pipe 3.

The insert pipe 3 allows the dimensional precision of the outer diameter and circularity of the assembly to be increased by being fitted on the outer circumferential surface of the molded portion 2, and the bonding strength between the molded portion 2 and the insert pipe 3 is reinforced by the reduced diameter portion 5 being embedded between the outer and inner parts of the tapered tip portion 2a of the molded portion 2. Also, the slag reservoir 2b for the molding plastic material is provided around the reduced diameter portion 5 so that the dimensional precision of the inner diameter of the core receiving bore 4a is improved as will be described hereinafter.

The molded portion 2 surrounding the sheath receiving bore 4c and tapered bore 4b is provided with a substantially uniform thickness with the aid of the thin-walled portion 6 on the rear part of the insert pipe 3. The engagement portion 7 formed around the rear end of the insert pipe 3 is useful both when using the ferrule main body 1 as an optical semiconductor module as it is, when manufacturing ferrules for butt connection, and when using the ferrule main body as a part of SC type or ST type ferrules.

The ferrule main body 1 can be held as desired by gripping the engagement portion 7 with a manipulator or the like when aligning the optical center line of the ferrule main body 1. The ferrule main body 1 can be integrally attached to a mounting member either by welding or by using a bonding agent following the alignment and positioning of the optical axial line. In particular, when the insert pipe 3 is made of metallic material such as stainless steel, the insert pipe 3 can be integrally attached to a mounting member 9 by laser welding or the like.

As will be described in detail hereinafter, when the ferrule main body 1 which is a primary molded product is placed in a metallic die assembly for a secondary molding process as an insert molding component to produce a ferrule of a certain type such as the ST type having a base portion injection molded onto the rear end of the ferrule main body 1, the engagement portion 7 embedded in the molded portion serves as a means for preventing relative rotation, and holding the assembly when placing it in a metallic die assembly for the secondary molding process by using a manipulator or the like.

The insert pipe 3 is required to provide a high dimensional precision of the outer circumferential surface, be suited for machining on the outer and inner circumferential surfaces, and be provided with rigidity and heat resistance that would withstand the force and heat that are encountered during the injection molding process. It is also required to have a good thermal conductivity and a small thermal shrinkage so as not to damage the molded plastic material. The material should therefore be selected from hard materials that would meet as many of these requirements as possible.

Hard materials that would meet such requirements include hard metals such as stainless steel, titanium and fiber reinforced metals (FRM), ceramics such as zirconia, and high performance engineering plastics such as polyimide resin. In particular, stainless steel is highly desirable in view of its cost, heat resistance, rigidity and dimensional precision. When the ferrule main body 1 is used as a module by itself, the insert pipe 3 can be easily laser welded if it is made of stainless steel.

In the embodiment illustrated in FIGS. 1 and 2, the insert pipe 3 consists of a relatively thick-walled metallic pipe. When it is made of stainless steel, the machining of the outer circumferential surface of the front end, enlarging and reducing the inner and outer circumferential surfaces of the rear end, respectively, and forming the reduced diameter portion 5 and large diameter portion 6 can be accomplished both economically and at high precision.

The metallic die assembly 8 for the primary molding process for injection molding the ferrule main body 1 is described with reference to FIG. 3. The metallic die assembly 8 comprises a moveable metallic die component 8A and fixed metallic die component 8B opposing each other on either side of a parting line PL. The moveable metallic die component 8A comprises a movable die plate 9 which is centrally incorporated with an inner core 10, and the inner core 10 is provided with a second core pin 11 for forming the tapered bore 4b and sheath receiving bore 4c of the ferrule main body 1.

The fixed metallic die component 8B is provided with a lower core 12 for receiving the insert pipe 3 and an upper core 15 fitted with a pin holder 14 supporting a first core pin 13 for forming the core receiving bore 4a of the ferrule main body 1, and a pin holder 14 centrally incorporated in the upper core 15 engages the upper surface of a cavity block 16 attached to the lower core 12 to prevent the pin holder 14 from coming off.

The core pins 11 and 13 are made of cemented carbide. The tip of the first core pin 13 is provided with a conical mating projection and the tip of the second core pin 11 is provided with a conical mating recess so that the mating projection and recess can be fitted one into the other and the tip of the first core pin 13 is supported by the tip 11a of the second core pin 11 when the metallic die assembly is closed.

The first core pin 13 is fitted into a mounting hole provided in the axial center of the pin holder 14, and is fixedly secured therein by using an epoxy or other two-part bonding agent. Because the inner diameter of the mounting hole is required to have a high dimensional precision, it is preferable to apply a metallic plating onto the base material and achieve desired dimensions by electroforming. To minimize the shrinkage of the molded product or prevent the generation of sink marks, highly thermally conductive nickel or nickel alloy may be electrodeposited onto base material having a high electric conductivity such as copper.

The cavity block 16 which prevents the pin holder 14 received in the upper fixed core 15 from coming off is formed with an inner bore 17a for defining a tapered tip cavity 17a for forming the tapered tip 2a of the molded portion and a reservoir cavity 17b for forming the resin reservoir 2b.

In a front part of the interior of the insert pipe 3, a small diameter portion cavity 17c for forming the small diameter cylindrical portion 2c of the molded portion 2 is defined between the small diameter inner circumferential surface 3a of the thick-walled main portion of the insert pipe 3 and the first core pin 13. In a rear part of the interior of the insert pipe 3, a large diameter portion cavity 17e for forming the large diameter cylindrical portion 2e of the molded portion 2 is defined between the inner circumferential surface 3c of the thin-walled portion 6 of the insert pipe 3 and the second core pin 11. In an intermediate part of the interior of the insert pipe 3, a tapered portion cavity 17d is defined between the tapered inner circumferential surface 3b of the tapered portion of the insert pipe 3 and the tip 11a of the second core pin 11.

Thus, a cavity 17 for injection molding the molded portion 2 comprised of the tapered tip cavity 17a, reservoir cavity 17b, thick-walled portion cavity 17c, tapered portion cavity 17d and large diameter portion cavity 17e is formed by closing the metallic die assembly 8 for the primary molding process.

To the large diameter portion cavity 17e of the cavity 17 are connected a plurality (four, for instance) of gates 18 extending radially along the metallic die parting line PL. Each gate 18 communicates with a spool (not shown in the drawing) provided above the fixed metallic die component 8B via an annular runner so that the molding plastic material injected from the spool may be filled into the cavity 17 and the molded portion 2 of the ferrule main body 1 may be injection molded.

The molding plastic material first flows into the large diameter portion cavity 17e, and then flows into the thick-walled portion cavity 17c via the tapered portion cavity 17d which narrows the flow of the molding plastic material radially inwardly. Thereafter, the molding plastic material flows towards the front end through the narrow passage (small diameter portion cavity 17c) defined between the small diameter inner circumferential surface 3a and the first core pin 13, and eventually reaches the reservoir cavity 17b after passing through the tapered tip cavity 17a and around the tip of the reduced diameter portion 5.

According to this process of injection molding, because the insert pipe 3 surrounding the first core pin 13 is provided with a large wall thickness and the small diameter portion cavity 17c is formed by the narrow passage defined between the small diameter inner circumferential surface 3a and first core pin 13, the injection speed can be increased without increasing the injection pressure, and this prevents the bending, curving or otherwise damaging the first core pin 13.

By increasing the injection speed, combined with the small dimensions of the small diameter portion cavity 17c and the use of stainless steel or other metallic material having a high thermal conductivity for the insert pipe 3, it is possible to rapidly and uniformly increase the temperature of the metallic die assembly so that the dimensional precision of the core receiving bore 4a can be ensured owing to the minimization of uneven thermal shrinkage. By increasing the wall thickness of the insert pipe 3 and thereby decreasing the size of the cavity, the use of relatively expensive plastic material is minimized, and this contributes to the reduction in the manufacturing cost.

At the front end of the reduced diameter portion 5, the flow of the plastic material passes around it and reaches the reservoir cavity 17b on the outer circumference of the assembly remote from the axial center where the core receiving bore 4a is located. Therefore, the part of the molding plastic material at the front end of the flow which contains a relatively large amount of slag is trapped in the reservoir cavity 17b so that the generation of flow marks and sink marks around the core receiving bore 4a is avoided and the distortion of the inner circumferential surface of the core receiving bore 4a is minimized.

When a pair of ferrules are to be joined to each other with one abutting the other, because the outer circumferential surface of the ferrule main body 1 on which a split sleeve is to be fitted is defined by the insert pipe 3 made of hard material, the required rigidity, circularity and precision of the outer diameter can be ensured as well as the coaxially with respect to the core receiving bore 4a.

The molded portion 2 is attached to the insert pipe 3 by surrounding the reduced diameter portion 5 formed as a thin walled portion at the tip of the insert pipe 3, the inner circumferential surface of an intermediate part of the molded portion 2 is engaged by the attachment between the tapered portion 2d and tapered inner circumferential surface 3b, and the outer circumferential surface of the rear end of the molded portion 2 is engaged by the rear end of the insert pipe 3 provided with the engagement portion 7. The molded portion 2 and insert pipe 3 are thus firmly bonded to each other, and there is no fear that the two parts separate from each other.

Figure 4A:
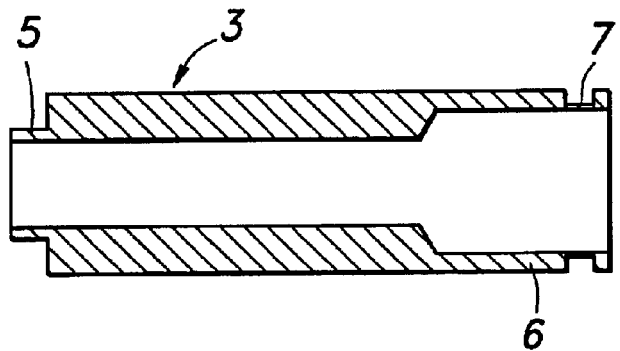
FIGS. 4a and 4b are a longitudinal sectional view and an end view of a modified embodiment of the insert pipe.
Figure 4B:
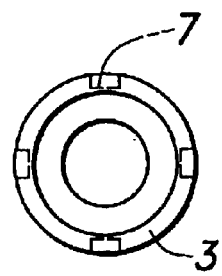
Figure 5A:
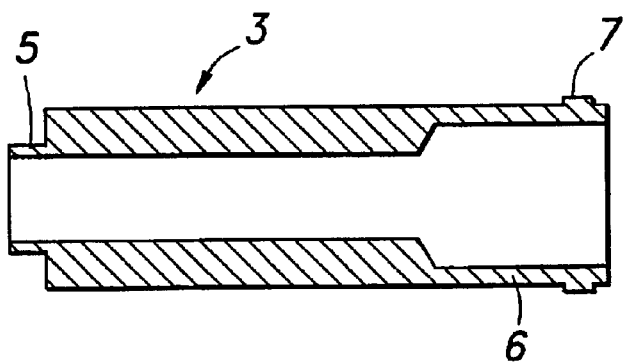
FIGS. 5a and 5b are a longitudinal sectional view and an end view of another modified embodiment of the insert pipe.
Figure 5B:
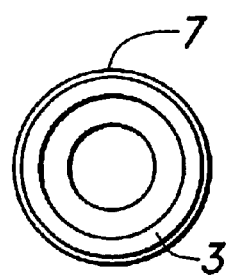

The insert pipe 3 may be provided with the engagement portion 7 by forming localized recesses on the outer circumferential surface of the insert pipe 3 as denoted by numeral 7 in FIGS. 4a and 4b, by providing an annular projection on the outer circumferential surface of the insert pipe 3 as denoted by numeral 7 in FIGS. 5a and 5b, or by forming localized projections (not shown in the drawings).

Figure 6A:
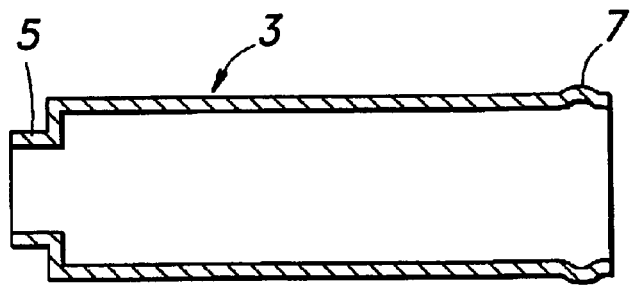
FIGS. 6a and 6b are a longitudinal sectional view and an end view of yet another modified embodiment of the insert pipe.
Figure 6B:
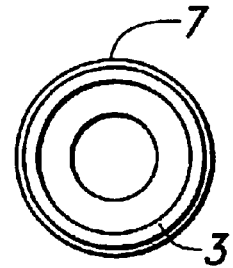
Figure 7:
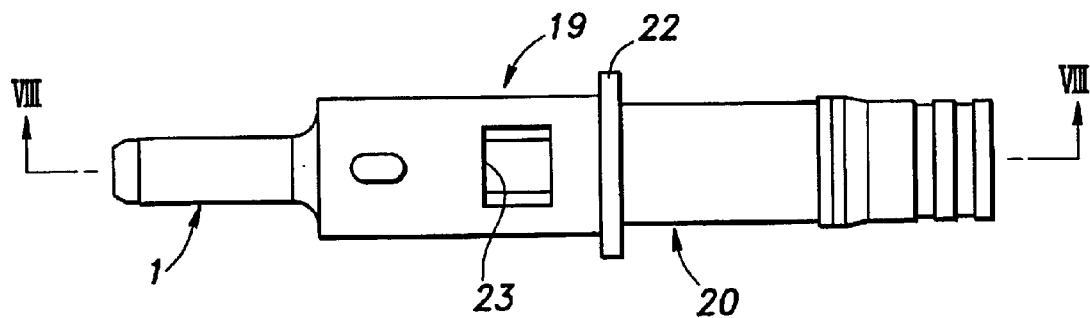
FIG. 7 is a side view of a ST type ferrule embodying the present invention.
Figure 8:
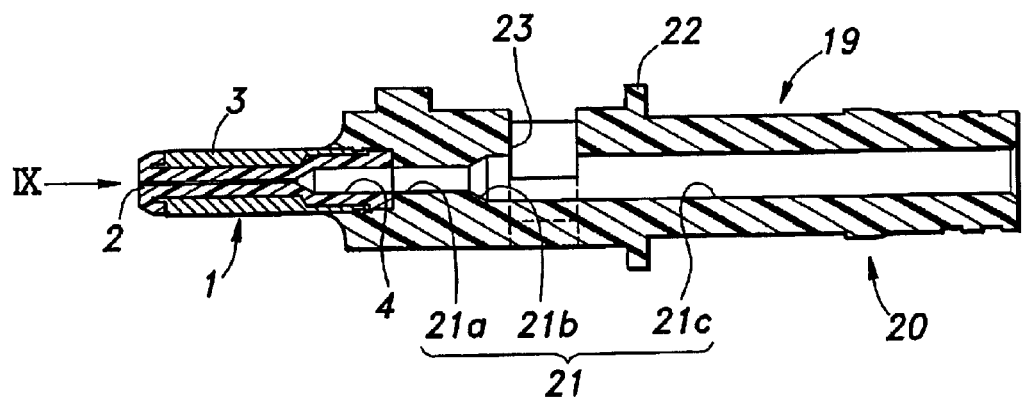
FIG. 8 is a longitudinal sectional view taken along line VIII—VIII of FIG. 7.
Figure 9:
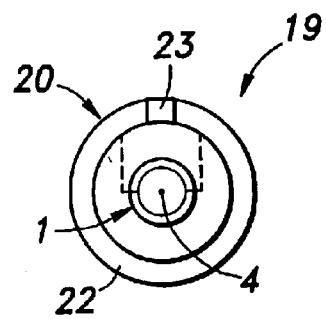
FIG. 9 is an end view as seen from the direction indicated by arrow IX of FIG. 8.
Figure 10:
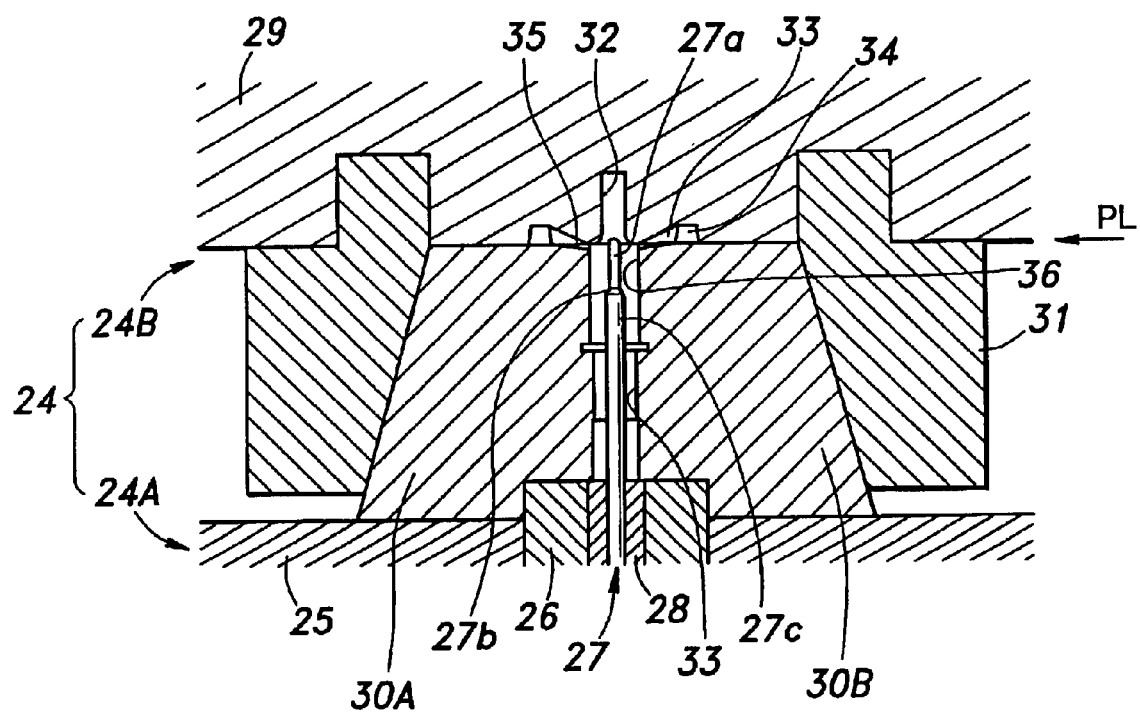
FIG. 10 is a fragmentary longitudinal sectional view of a metallic die assembly for a secondary molding process for molding the base portion 20 of the ST type ferrule 19 illustrated in FIG. 7 by using the ferrule main body illustrated in FIG. 1 as an insert component.

It is also possible to form the insert pipe 3 by using a thin walled pipe member and press form the same in such a manner that a reduced diameter portion 5 is formed at the front end and an annular engagement portion 7 is formed by bulging out the outer circumferential surface of the rear end of the insert pipe 3 as illustrated in FIGS. 6a and 6b.

Now is described the process of fabricating a ST type ferrule 19 by integrally joining a ST type base portion 20 to the rear end of the ferrule main body 1 or the primary molded product by injection molding the ST type base portion 20 onto the ferrule main body 1 in a metallic die assembly for a secondary molding process by using the ferrule main body 1 as an insert component with reference to FIGS. 7 to 15.

The ST type base portion 20 can take any of a number of forms. In the case of the embodiment illustrated in FIGS. 7 to 9, a fiber receiving bore 21 communicating with the fiber receiving bore 4 of the ferrule main body 1 is axially centrally provided therein, and the outer circumferential surface thereof is provided with a flange portion 22 extending perpendicularly with respect to the fiber receiving bore 21, a lateral hole 23 and other features.

In the illustrated ST type ferrule 19, the front end of the ST type base portion 20 surrounds the rear end of the ferrule main body 1, and is integrally attached thereto. The engagement portion 7 of the insert pipe 3 engages the molding plastic material of the ST type base portion 20. Also, the molding plastic material of the ST type base portion 20 is attached to the outer circumferential surface and end surface of the large diameter cylindrical portion 2e of the molded portion 2 exposed from the insert pipe 3. Thereby, the two parts are firmly joined to each other.

If the ST type base portion 20 is required to have a high dimensional precision as that of the ferrule main body 1 and/or if the strength of attachment to the ferrule main body 1 is desired to be increased, the same material as that of the ferrule main body 1, such as type I or type II liquid crystal polymer, may be used. Otherwise, the ST type base portion 20 may be made of type III liquid crystal polymer of the same kind or plastic material of different kinds such as polybutylene terephtalate or other engineering plastic materials so as to reduce the manufacturing cost.

The "same" kind as used herein means that the two molding materials are made of the same polymeric substance of a same grade or different grades, and the "different" kind as used herein means that the two molding materials are made of different polymeric substances which are normally of different grades. More specifically, type I liquid crystal polymer is superior in both heat resistance and dimensional precision, but is relatively inferior in moldability, type III liquid crystal polymer is highly moldable and economical but somewhat inferior in both heat resistance and dimensional precision, and type II liquid crystal polymer is intermediate between the other two types. Any one of them can be selected depending on the particular requirements.

The process of fabricating the ST type ferrule 19 using the metallic die assembly 24 for the secondary molding process is described in the following with reference to FIGS. 10 to 15. Because the ST type base portion 20 is provided with various features on the outer circumferential surface thereof, a split metallic die assembly is used so that the molded product provided with undercut portions may be removed out of the metallic die assembly by opening up the die assembly and the removal of the ST type ferrule 19 after it has been molded may be facilitated.

The metallic die assembly 24 consists of a moveable metallic die component 24A and a fixed metallic die component 24B. The moveable metallic die component 24A comprises a moveable die plate 25 and a moveable core 26 fitted in a central part of the moveable die plate 25. A base core pin 27 for forming the sheath receiving bore 21 in the axial center of the ST type base portion 20 is mounted to the moveable core 26 via an ejector sleeve 28.

The base core pin 27 consists of a small diameter pin portion 27a provided in a front end thereof, a large diameter pin portion 27c provided in a rear end thereof, and a tapered pin portion 27b connecting the small diameter pin portion 27a with the large diameter pin portion 27c. The tapered tip of the small diameter pin portion 27a is inserted in the fiber receiving bore 4 and fits into the tapered bore 4b of the ferrule main body 1 so that the molding plastic material for the secondary molding process would not flow into the fiber receiving bore 4.

The rear end of the small diameter pin portion 27a forms an inner sheath receiving bore 21a for receiving the inner sheath of the optical fiber in the axial center of the ST type base portion 20 so as to connect the inner sheath receiving bore 21a with the sheath receiving bore 4c. The large diameter pin portion 27c forms an outer sheath receiving bore 21c for receiving the outer sheath of the optical fiber, and the tapered pin portion 27b forms a tapered bore 21b for guiding the insertion of the core and inner sheath of the optical fiber.

In the metallic die assembly 24, the fixed metallic die component 24B includes a cavity block 29 which is located immediately above the parting line PL, and the moveable metallic die component 24A includes a slide core block 30 (consisting of two parts 30A and 30B) which is located immediately below the parting line PL. The two parts of the slide core block 30A and 30B are adapted to slide laterally away from each other, and the slide core block 30 is surrounded by the locking block 31 having an upper end supported by the cavity block 29.

The cavity block 29 is formed with an insert hole 32 for receiving the ferrule main body 1 as an insert component, and a plurality (four, for instance) of runners 33 extending radially (at the interval of 90 degrees, for instance) along the parting line PL. The outer end of each runner 33 is connected to a spool (not shown in the drawing) via a common annular runner 34, and the inner end of each runner communicates with a cavity 36 provided in the slide core block 30 for forming the ST type base portion 20.

Figure 11:
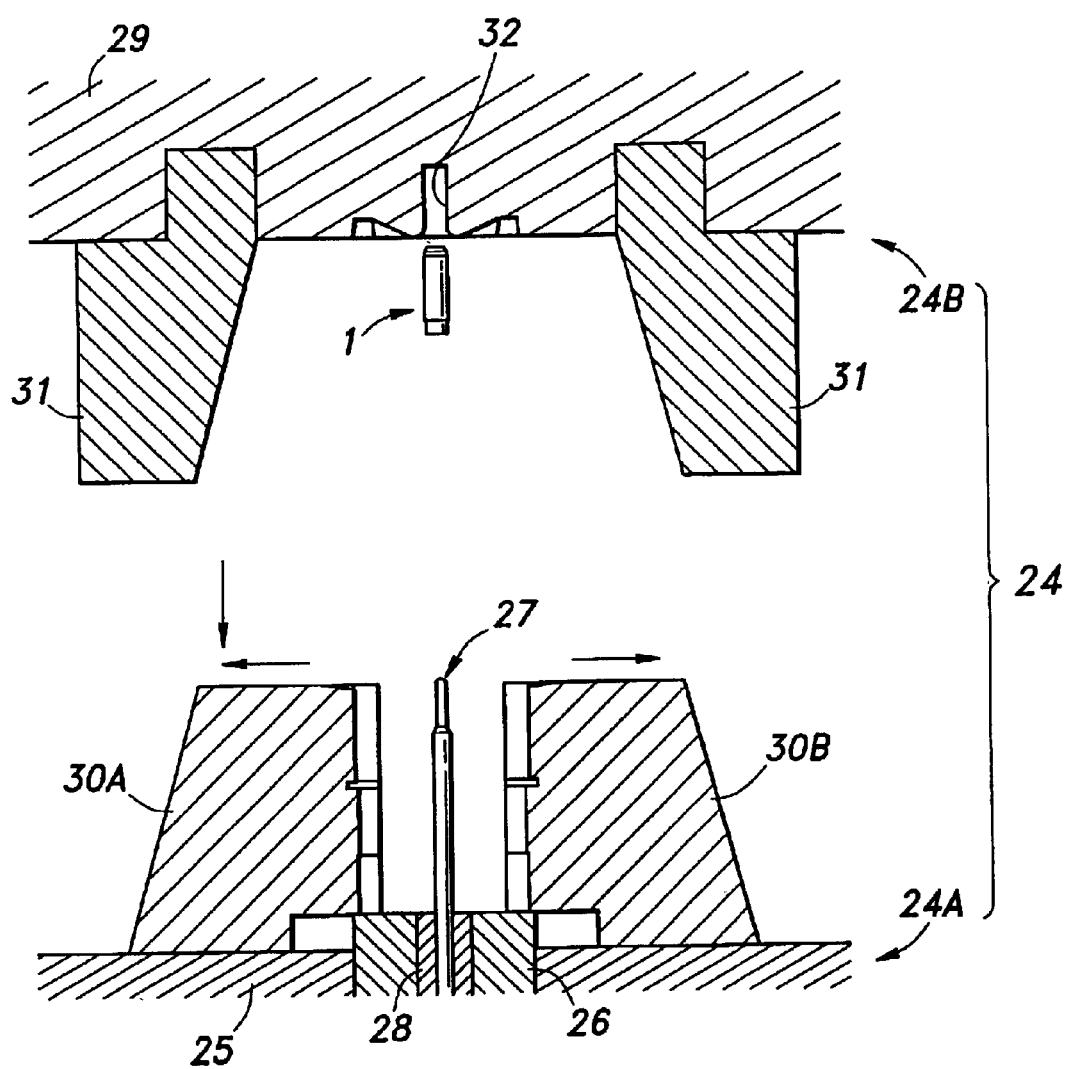
FIG. 11 is a view similar to FIG. 10 showing the process of making a ST ferrule by using the metallic die assembly illustrated in FIG. 10, and, in particular, the step of opening the die assembly to place the ferrule main body inside the die assembly.

The process of injection molding the ST type base portion 20 by using the metallic die assembly 24 is described in the following with reference to FIG. 11. By lowering the moveable metallic die component 24A, by virtue of an angular pin (not shown in the drawing) provided between the moveable metallic die component 24A and fixed metallic die component 24B, the two parts of the slide core block 30A and 30B are moved away from each other so as to achieve an open state of the metallic die assembly 24 and allow the ferrule main body 1 to be placed in the insert hole 32 of the cavity block 29 as an insert component.

The die assembly 24 is then closed as illustrated in FIG. 12 so that the small diameter pin portion 27a of the base core pin 27 is fitted into the tapered bore 4b and sheath receiving bore 4c of the ferrule main body 1 which is to be inserted, and the cavity 36 for forming the ST base portion 20 is defined between the base core pin 27 and the two parts of the slide core block 30A and 30B.

The molding plastic material injected from the spool is filled into the cavity 36 of the ST type base portion 20 from the gate 35 via the annular runner 34 and runner 33, and the ST type base portion 20 is thereby injection molded onto the rear end of the ferrule main body 1 in an integral manner as shown in FIG. 13.

Figure 14:
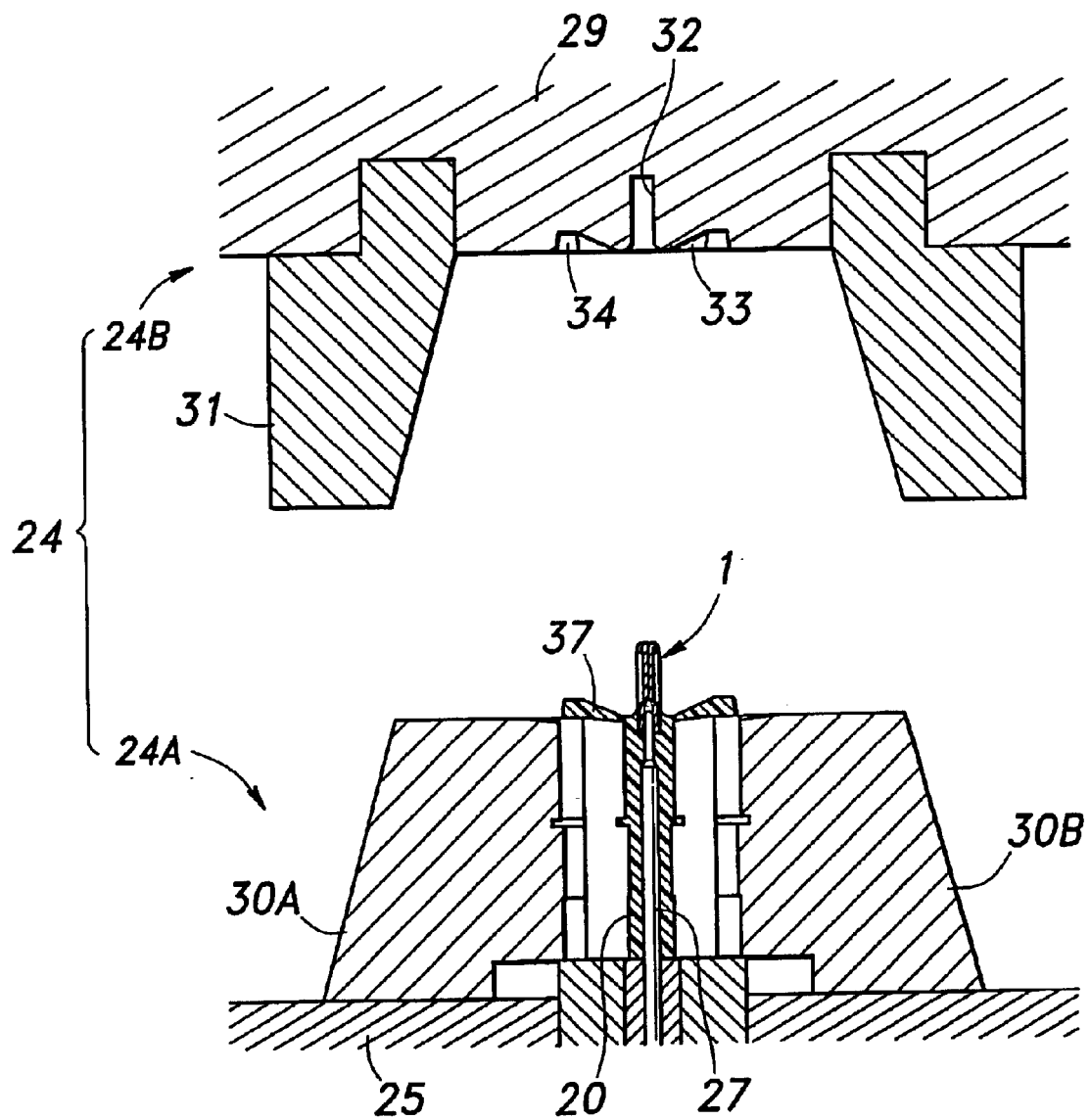
FIG. 14 is a view similar to FIG. 10 showing the process of making a ST ferrule using the metallic die assembly illustrated in FIG. 10, and, in particular, the step of opening the die assembly to pull out the ST type ferrule toward the moveable metallic die component.

After the injection molded molding plastic material has cured, the moveable metallic die component 24A and fixed metallic die component 24B are opened relative to each other as shown in FIG. 14. The ferrule main body 1 is removed from the insert hole 32 of the fixed metallic die component 24B, and the scrap portion 37 which is molded in the runner 33 and annular runner 34 and integrally connected with the ST type base portion 20 is removed toward the moveable metallic die component 24A along with the ST type base portion 20.

Figure 15:
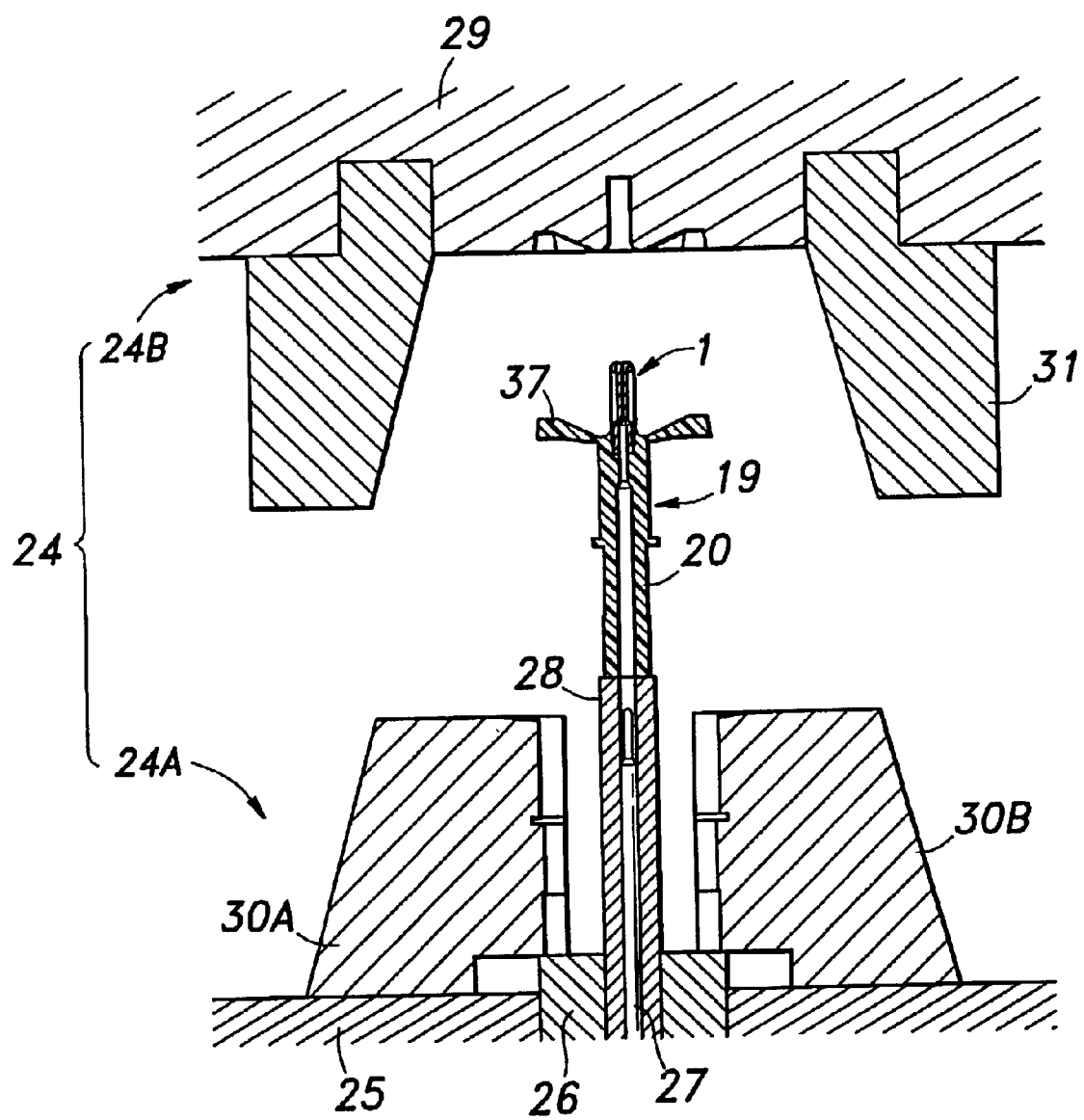
FIG. 15 is a view similar to FIG. 10 showing the process of making a ST ferrule using the metallic die assembly illustrated in FIG. 10, and, in particular, the step of pushing out the ST type ferrule out of the moveable metallic die component by using the ejector sleeve.

Then, the ejector sleeve 28 which is fitted in the moveable core 26 is pulled up to cause the tip of the ejector sleeve 28 to be lifted above the slide core block parts 30A and 30B as shown in FIG. 15. The ST type ferrule 19 including the scrap portion 37 is pushed out, and the ST type ferrule 19 is completed by removing the scrap portion 37 as a separate process and performing a finishing process as required.

A SC type ferrule 38 formed by integrally joining a SC type base portion 39 onto the rear end of the ferrule main body prepared as a primary molded product is now described in the following as well as the method for making the same by injection molding the SC type base portion 39 onto the ferrule main body 1 serving as an insert component in a metallic die assembly 41 for a secondary molding process.

Figure 16:
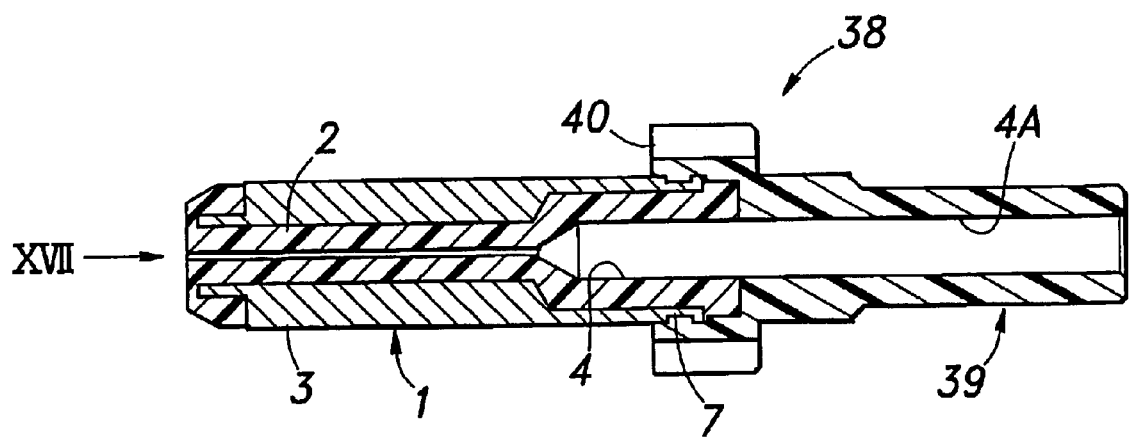
FIG. 16 is a longitudinal sectional view of a SC type ferrule embodying the present invention.
Figure 17:
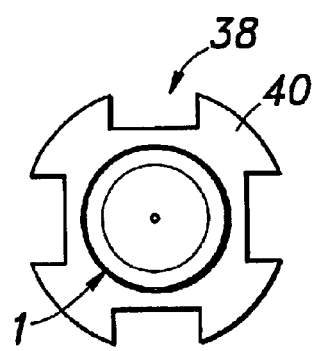
FIG. 17 is an end view as seen from the direction indicated by arrow XVII of FIG. 16.

The SC type base portion 39 may have any one of a large number of possible forms, and may be formed as illustrated in FIGS. 16 and 17, for instance. In the illustrated example, a communication bore 4A communicating with the fiber receiving bore 4 of the ferrule main body 1 is formed in an axial center thereof, and a flange portion 40 extending perpendicularly thereto is formed around the outer circumference thereof.

In the SC type ferrule 38, the front end of the SC type base portion 39 is integrally attached to and surrounds the rear end of the ferrule main body 1, and the molding plastic material of the SC type base portion 39 is attached to the engagement portion 7 of the insert pipe 3. The outer circumferential surface and end surface of the rear end of the large diameter portion 2e of the molded portion 2 exposed from the rear end of the insert pipe 3 is welded to the molding plastic material of the SC base portion 39 and is thereby firmly attached thereto.

Figure 18:
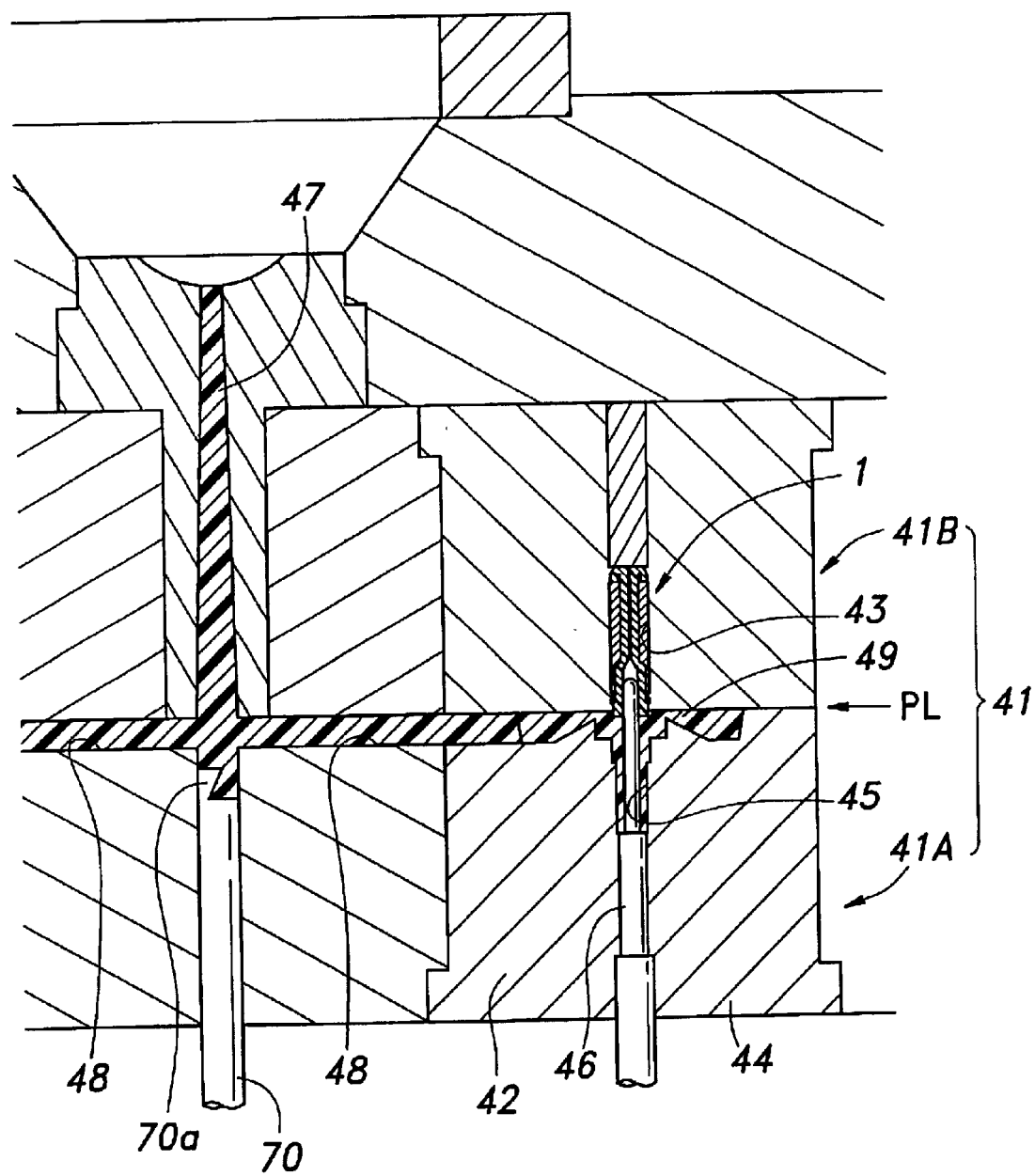
FIG. 18 is a fragmentary longitudinal sectional view of a metallic die assembly for a secondary molding process for molding the base portion of the SC type ferrule illustrated in FIG. 16 using the ferrule main body illustrated in FIG. 1 as an insert component.

Referring to FIG. 18, in a metallic die assembly 41, the lower moveable metallic die component 41A and upper fixed metallic die component 41B oppose each other about the parting line PL. The fixed metallic die component 41B comprises a fixed die plate 42 having an insert bore 43 for receiving the ferrule main body 1. The movable metallic die component 41A comprises a moveable die plate 44 defining a cavity 45 for forming the SC type base portion 39, and a base core pin 46 placed axially centrally in the cavity 45. Numeral 70 denotes an ejector pin for ejecting the molded production upon completion of the molding process.

The ferrule main body 1 is received in the fixed metallic die component 41B, and the moveable metallic die component 41A is closed upon the fixed metallic die component 41B. The tip of the base core pin 46 is fitted into the fiber receiving bore 40 of the ferrule main body 1, and the molding plastic material injected from a spool 47 is distributed to a plurality of runners (when a plurality of products are to be molded at the same time) and filled into each of the cavities 45 via a gate 49 to thereby form the SC base portion 39.

Upon completion of the molding process, the moveable metallic die component 41A is moved away from the fixed metallic die component 41B. At this time, an undercut portion 70a provided in the upper or inner end of the ejector pin 70 engages the molded product so that the molded product stays held in the moveable metallic die component 41A. Once the moveable metallic die component 41A has moved to the final open position, the ejector pin 70 is pushed into the moveable metallic die component 41A to eject the molded product from the moveable metallic die component 41A.

By thus injection molding the molded portion 2 onto the insert pipe 3 as a primary molded product, and then injection molding the ST or SC type base portion 20 or 39 onto the rear end of the ferrule main body 1 using the ferrule main body 1 as an insert component, the ST or SC type ferrule 19 or 38 can be easily produced as a secondary molded product.

In the ST or SC type ferrule 19 or 38, the engagement portion 7 formed in the insert pipe 7 is attached to the molded portion of the base portion 20 or 39, which is molded as a secondary molded product, by being embedded therein. Also, the molded portion on the rear end of the ferrule main body 1 exposed out of the insert pipe 3 is welded onto the molded portion of the base portion 20 or 39 during the secondary molding process. These two factors jointly achieve a firm attachment between the two parts.

The secondary molding process for the base portion 20 or 39 can be performed using the same or a different material as or from that of the ferrule main body 1. Thereby, a desired bonding strength between the molded portions of the two parts can be achieved. When a high dimensional precision is required also for the base portion 20 or 39, the base portion 20 or 39 may be made of the same material as that of the ferrule main body 1. When the manufacturing cost is desired to be reduced, the base portion 20 or 39 may be made of a material different from that of the ferrule main body 1 which is normally of a lower grade than that of the ferrule main body 1.

Because the ST type and SC type ferrule 19 for butt connection is manufactured by the secondary molding process using the ferrule main body 1, which can also be used as a ferrule for optical semiconductor modules by itself, as an insert component, the ferrule main body 1 can be mass produced, and the manufacturing cost can be reduced. Also, the procurement and stocking of component parts can be simplified.

Figure 19:
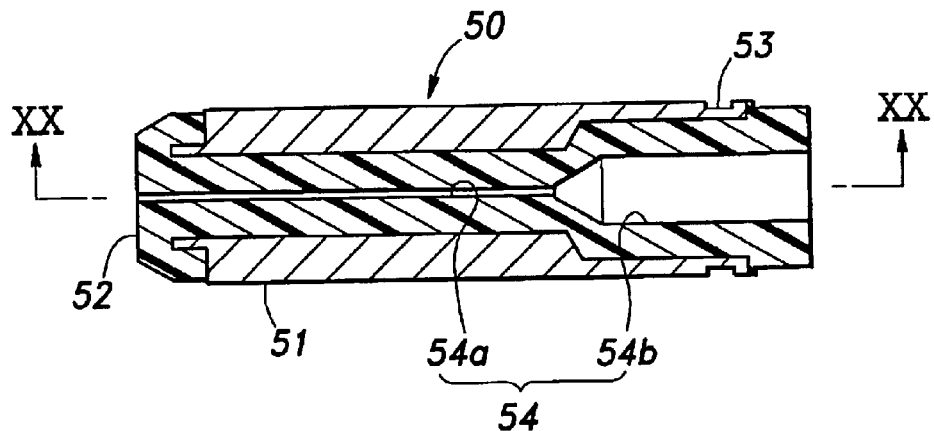
FIG. 19 is a longitudinal sectional view of a two-core ferrule main body embodying the present invention.
Figure 20:
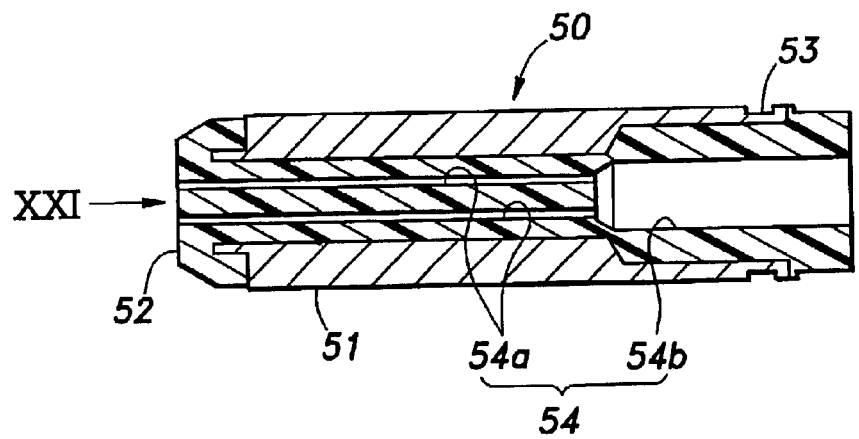
FIG. 20 is a longitudinal sectional view taken along line XX—XX of FIG. 19.
Figure 21:
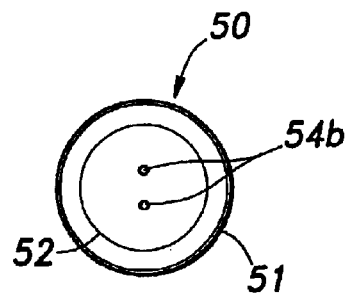
FIG. 21 is an end view as seen from the direction indicated by arrow XXI of FIG. 20.

The ferrule main body 1 can also be implemented as a multi-core ferrule main body 50 having two or more core receiving bores as illustrated in FIGS. 19 to 21. By performing a secondary molding process, this ferrule main body 50 can also be used for fabricating a ST type or SC type multi-core ferrule. Referring to FIGS. 19 to 21, the ferrule main body 50 consists of an insert pipe 51 and a molded portion 52 similarly as with the ferrule main body 1, and is provided with an engagement portion 53 on the outer circumferential surface of the rear end of the insert pipe 51 and a fiber receiving bore 54 including core receiving bores 54a and a sheath receiving bore 54b in an axial center of the molded portion 52.

The ferrule main body 50 is different from the ferrule main body 1 in that a pair of core receiving bores 54a are formed in the front end of the sheath receiving bore 54b in a mutually parallel relationship. Therefore, when injection molding the molded portion 52 of the ferrule main body 50 while the insert pipe 51 is placed in the metallic die assembly, a pair of extremely fine core pins corresponding to the core receiving bores 54a are required to oppose the core pin which corresponds to the sheath receiving bore 54b.

Figure 22:
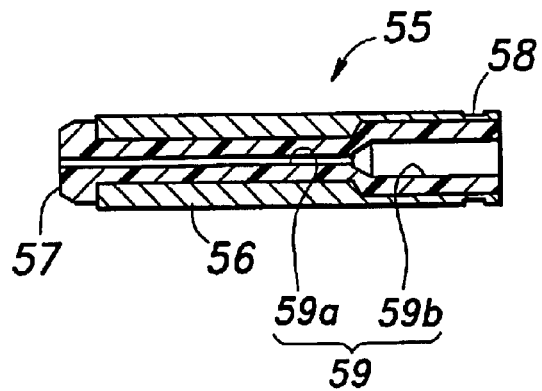
FIG. 22 is a longitudinal sectional view of a half-size ferrule main body embodying the present invention.
Figure 23:
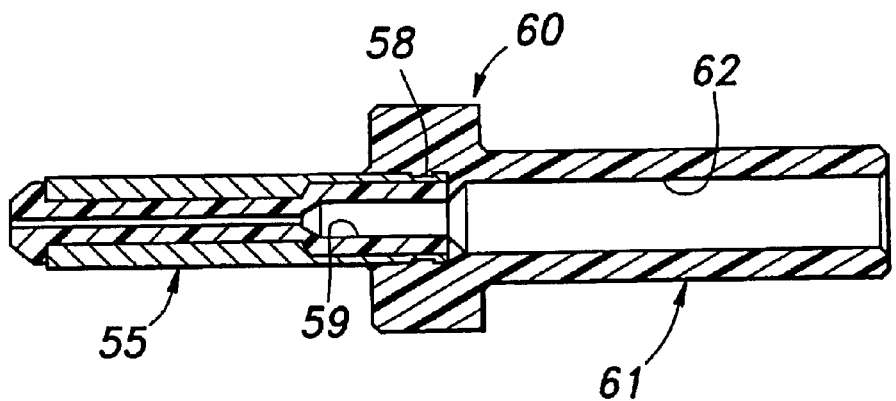
FIG. 23 is a longitudinal sectional view of a MU type ferrule embodying the present invention.
Figure 24:
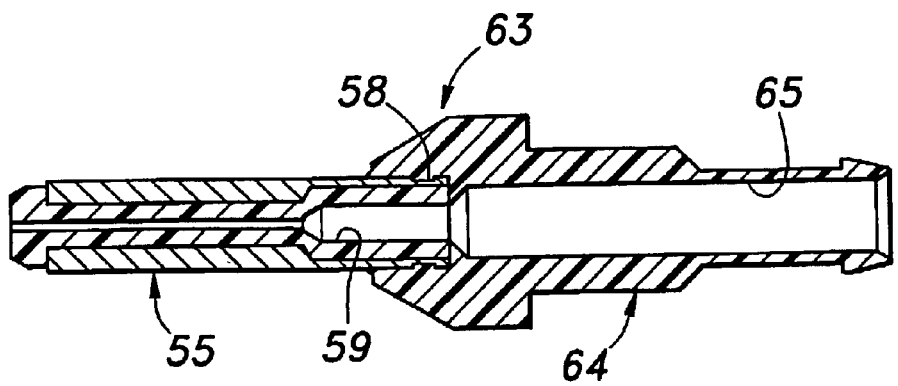
FIG. 24 is a longitudinal sectional view of a LC type ferrule embodying the present invention.

It can also be implemented as a half-size ferrule main body 55 as illustrated in FIGS. 22 to 24. By performing a secondary molding process, the ferrule main body 55 can also be similarly used for fabricating a half-size MU type or LC type ferrule 60 or 63.

The ferrule main body 55 illustrated in FIG. 22 consists of an insert pipe 56 and a molded portion 57 similarly as with the ferrule main body 1, and is provided with an engagement portion 58 on the outer circumferential surface of the rear end of the insert pipe 56 and a fiber receiving bore 59 including a core receiving bore 59a and a sheath receiving bore 59b in an axial center of the molded portion 57.

However, whereas the outer diameter of the tip (the outer diameter of the insert pipe 3) is 2.499 mm and the inner diameter of the core receiving bore 4a is 0.125 mm in the case of the ferrule main body 1, the outer diameter of the tip (the outer diameter of the insert pipe 56) is 1.249 mm and the inner diameter of the core receiving bore 4a is 0.125 mm in the case of the ferrule main body 55.

Therefore, the wall thickness of the molded portion between the inner diameter of the insert pipe 56 and core receiving bore 59a is so small that the effect of thermal shrinkage on the core receiving bore 59a becomes extremely small. Therefore, in the embodiment illustrated in FIG. 22, the tip of the insert pipe 56 is not provided with a reduced diameter portion. However, it is also possible to provide a reduced diameter portion similar to the reduced diameter portion 5 of the insert pipe 3 of the ferrule main body 1.

Referring to FIGS. 23 and 24, a half-size MU type or LC type ferrule 60 or 63 can be manufactured by placing the ferrule main body 55 in a metallic die assembly for a secondary molding process, and injection molding a base portion 61 or 64 having an outer sheath receiving (communication) bore 62 or 65 in an axial center thereof for receiving the outer sheath of an optical fiber onto the rear end of the ferrule main body 55 so as to integrally join them. The method of fabrication and advantages are similar to those of the foregoing embodiment.

Although the present invention has been described in terms of preferred embodiments thereof, it is obvious to a person skilled in the art that various alterations and modifications are possible without departing from the scope of the present invention which is set forth in the appended claims.

What is claimed is:

1. A ferrule main body, comprising: an insert pipe defining an outer circumferential surface of said ferrule main body, and a molded plastic member made of a first plastic material and disposed inside said insert pipe integrally therewith and having an optical fiber receiving bore in an axial center thereof; wherein a rear end of said insert pipe is provided with an engagement portion which is exposed on an outer circumferential surface of said ferrule main body, the engagement portion of said insert pipe comprising a radial projection or a radial recess on the outer circumferential surface of the ferrule main body.

2. A ferrule main body according to claim 1, wherein said optical fiber receiving bore comprises a core receiving bore and a sheath receiving bore.

3. A ferrule main body according to claim 1, wherein said engagement portion comprises a radial projection.

4. A ferrule main body according to claim 1, wherein said engagement portion comprises a radial recess.

5. A ferrule main body according to claim 1 wherein a part of said molded plastic member projects rearward from a rear end of said insert pipe.

6. A die assembly for molding a ferrule by using a ferrule main body according to claim 1 as an insert component, comprising:
   a first die component defining a first cavity adapted to receive said ferrule main body while exposing a rear end portion of said ferrule main body;
   a second die component defining a second cavity communicating with said first cavity and adapted to mold a tubular base portion onto a rear end of said ferrule main body received in said first cavity, said tubular base portion having a communication bore aligned with said optical fiber receiving bore of said ferrule main body formed in an axial center thereof;
   a core pin adapted to be passed axially centrally from an axial end remote from said first cavity into said second cavity to form said communication bore of said base portion disposed coaxially with and communicating with said optical fiber receiving bore, said core pin being provided with a free end which closely fits into said optical fiber receiving bore of said ferrule main body.

7. A method for molding a ferrule, comprising the steps of: preparing an insert pipe provided with an engagement portion formed on a rear end of an outer circumferential surface thereof, said insert pipe defining an outer circumferential surface of a front portion of said ferrule and the engagement portion of said insert pipe comprising a radial projection or a radial recess on the outer circumferential surface of said ferrule; molding a molded plastic member made of a first plastic material inside said insert pipe integrally therewith and having an optical fiber receiving bore in an axial center thereof; and molding a tubular base portion made of a second plastic material on a rear end of said ferrule main body, said rear end including said engagement portion of said insert pipe, said tubular base portion extending rearwardly from said molded plastic member and having a communication bore aligned with said optical fiber receiving bore of said ferrule main body formed in an axial center thereof.

8. A method for molding a ferrule according to claim 7, wherein said engagement portion comprises a radial projection.

9. A method for molding a ferrule according to claim 7, wherein said engagement portion comprises a radial recess.

10. A method for molding a ferrule according to claim 7, wherein a part of said molded plastic member projects rearward from a rear end of said insert pipe, and said tubular base portion is molded onto said projecting part of said molded plastic member.

11. A method for molding a ferrule according to claim 7, wherein said first plastic material comprises liquid crystal polymer.

12. A method for molding a ferrule according to claim 7, wherein said first plastic material and second plastic material consist of different polymer materials.

13. A method for molding a ferrule according to claim 7, wherein said first plastic material is of a higher grade than said second plastic material.

14. A method for molding a ferrule according to claim 7, wherein said optical fiber receiving bore includes a core receiving bore in a front end thereof and a sheath receiving bore in a rear end thereof, and said insert pipe comprises a thick wailed portion surrounding said core receiving bore and a thin walled portion surrounding said sheath receiving bore.

15. A method for molding a ferrule according to claim 7, wherein a front end of said insert pipe comprises a reduced diameter portion having a reduced outer diameter, and said molded portion comprises a slag reservoir portion formed around said reduced diameter portion.

16. A ferrule, comprising:
   a ferrule main body including an insert pipe defining an outer circumferential surface of said ferrule main body and a molded plastic member made of a first plastic material which is disposed inside said insert pipe integrally therewith and provided with an optical fiber receiving bore in an axial center thereof; and
   a tubular base portion made of a second plastic material and molded onto a rear end of said ferrule main body, said base portion having a communication bore aligned with said optical fiber receiving bore of said ferrule main body formed in an axial center thereof;
   wherein said optical fiber receiving bore includes a core receiving bore in a front end thereof and a sheath receiving bore in a rear end thereof, and said insert pipe comprises a thick walled portion surrounding said core receiving bore and a thin walled portion surrounding said sheath receiving bore.

17. A ferrule according to claim 16, wherein a front end of said insert pipe comprises a reduced diameter portion having a reduced outer diameter, and said molded portion comprises a slag reservoir portion formed around said reduced diameter portion.

* * * * *